Dec. 9, 1941.  C. E. PETERS  2,265,544
BATTERY CHARGER FOR RAILWAY CARS
Filed April 4, 1940  3 Sheets-Sheet 1

INVENTOR.
Carl E. Peters
BY Roy M. Eilers
ATTORNEY.

Dec. 9, 1941.　　　　　　C. E. PETERS　　　　　　2,265,544
BATTERY CHARGER FOR RAILWAY CARS
Filed April 4, 1940　　　　3 Sheets-Sheet 3

INVENTOR.
Carl E. Peters
BY
Roy M. Eilers
ATTORNEY.

Patented Dec. 9, 1941

2,265,544

UNITED STATES PATENT OFFICE 2,265,544

BATTERY CHARGER FOR RAILWAY CARS

Carl E. Peters, St. Louis, Mo., assignor to B-L Electric Manufacturing Company, St. Louis, Mo., a corporation of Missouri Application April 4, 1940, Serial No. 327,815

4 Claims. (Cl. 171—313)

This invention relates to improvements in battery chargers for railway cars. One object of this invention is to provide an inexpensive and simple battery-charging means which may be carried on railroad rolling stock and operated when the rolling stock is not in motion.

Railroad rolling stock ordinarily is equipped to generate and accumulate electricity while it is in motion. The equipment which the railroad cars carry, generates and accumulates sufficient electricity to operate the electrical devices used in the cars while the car is running. The amount of electricity stored in the car batteries is not sufficient to operate the car's electrical equipment when the cars stand motionless for substantial periods of time. This is especially true in summer when the cars stand in the stations and depots with their refrigerating apparatus in operation. To keep the batteries charged and to operate the electrical equipment on the car while the car is motionless, the railroads have installed devices on the cars to change the alternating current universally found in depots into direct current for use in the cars. The means ordinarily used are of two types. The first is a motor generator installation while the other is a rectifier system. The invention is an improvement on the latter type.

The rectifiers which may be used on railway cars must have a large current capacity and must be compact enough to be mounted on a car. The relatively small size and the relatively large capacity of the rectifiers require that the rectifiers be cooled during the charging operation. This is usually done by mounting a fan near the rectifier and blowing air over it. Because the rectifier is carried on the car, it is exposed to water, dust, and dirt, and is, therefore, usually enclosed in a waterproof casing. To permit cooling of the rectifier, an opening in the casing must be provided. Because attendants in the station might forget to open a door in the casing, some manufacturers put holes or other openings in the casing to permit passage of air through the casing. The objection to the use of a casing having openings without a door or other means to close them, is that the rectifier will be exposed to water, dust, and dirt when the car is in motion. One object of the present invention is to provide a rectifier mounted in a waterproof casing which is equipped with a door that must be opened when the rectifier is operated and must automatically close when the operation of the rectifier is suspended. By use of the present invention, a rectifier of compact size and large capacity for use on railway cars may be enclosed in a casing that will prevent exposure of the rectifier to dust, dirt, and water while the railway car is in motion, and will necessitate the opening of an air passage through the casing whenever the rectifier is operating. This makes the operation of the rectifier as safe and as certain as possible.

Variations in the voltage drawn from a rectifier materially affect the current which the device rectifies. If the current becomes very great, injury to the rectifier is likely to result. The problem of variation in the voltage drawn from the rectifier is very important where air-conditioning equipment is mounted on a railway car, because the voltage of the electrical circuit is appreciably lower when the compressor unit is operating than when the compressor unit is not operating. Therefore, if a rectifier was designed to furnish a certain amount of current when the compressor unit was not operating, the current passing through it when the compressor unit started to operate would be very much greater than the desired value, and might injure the rectifier. If a rectifier were designed to give a certain amount of current when the voltage is low because of the operation of the refrigeration equipment, the current would decrease to a very low value when the voltage would rise on the suspension of the operation of the compressor unit. It is, therefore, an object of this invention to provide means for supplying a certain amount of current to the circuit when the refrigeration equipment is not operating, and to maintain the charging current below a predetermined value when the compressor unit is operating.

Other objects and advantages of the invention will be shown and described in the drawings and accompanying description.

In the accompanying drawings, Fig. 1 is a view of the elements of the charging means as they are mounted in the waterproof casing.

Figure 1:
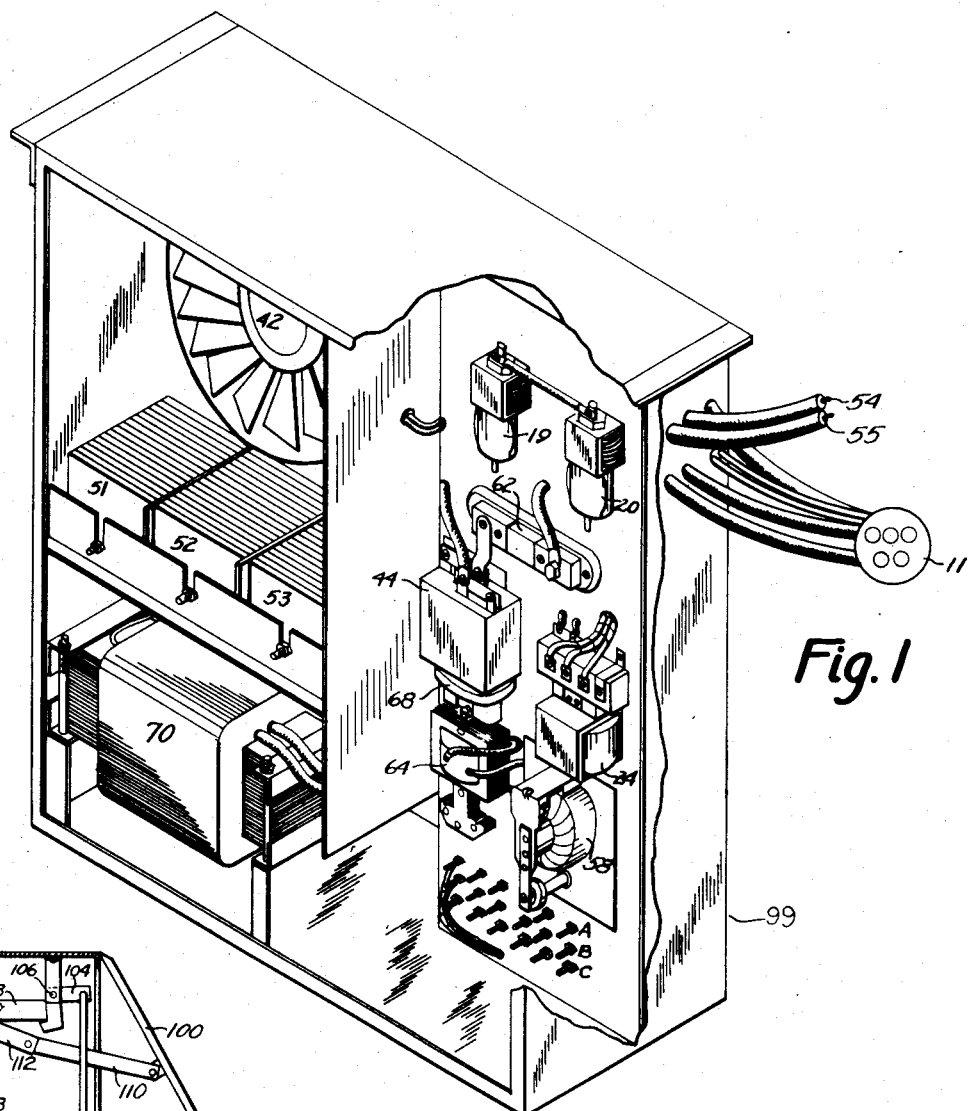

The drawings and accompanying description show and describe a preferred form of the invention, but it is to be understood that the invention is not limited by the specification or the drawings, but will be defined by the appended claims.

In the drawings a five pronged plug, bearing leads from a source of three-phase electric current and bearing also a conductor 17, is denoted by the numeral 13. A receptacle for plug 13 is denoted by numeral 11. Connected to receptacle 11 are leads 10, 12, 14, 16, and 18. Numerals 19 and 20 denote magnetic overload relays. Contacts are denoted by numerals 21, 22, 23, 30, 32, and 34. These contacts are bridged by contactors 28 that are mounted on armature 26 which is operated by solenoid coil 24. Numerals 36, 38, and 40 denote binding posts on transformer 70. A, B, and C denote primary windings of the transformer. A fan motor is denoted by numeral 42. A solenoid coil is denoted by numeral 44, the armature operated by the solenoid 44 is 46, and the contacts which the armature 46 bridges are 48 and 50. Rectifier elements are denoted respectively by numerals 51, 52, and 53. The leads from the rectifiers are 49 and 54. Numeral 55 denotes the positive lead of a battery that is not shown in the drawings. Numeral 100 denotes a door that forms a part of casing 99. A handle 98 operates the door 100 through levers 110 and 112. Mounted on the handle 98 is a mercury switch 56. A solenoid coil 58 and an armature 60 operate through lever 102 and catch 104 to hold door 100 open while the charger is operating. An ammeter shunt is provided for the battery charger and is denoted by the numeral 62. A solenoid coil 64, an armature 66, and a resistor 68 comprise a current-limiting relay. The numeral 70 denotes a three-phase transformer having three primary windings, 72, 74, and 76. The numerals 78, 80, 82, 84, 86, 87, 88 and 89 denote electrical junctions. The secondary of transformer 70 has three taps 92, 94, and 96 which are connected to rectifiers 51, 52, and 53.

The external operation of the battery charger consists of the insertion into receptacle 11 of five pronged plug 13, and the movement of starting handle 98 on the casing 99 into the "on" position. For this external operation, there is a corresponding internal operation of the charger. The insertion of plug 13 into receptacle 11 connects leads 10, 12, and 14 with a source of three-phase alternating current and also connects leads 16 and 18 to the ends of conductor 17, and the movement of starting handle 98 into the "on" position opens door 100 and tilts mercury switch 56 into the "on" position.

Figure 4:
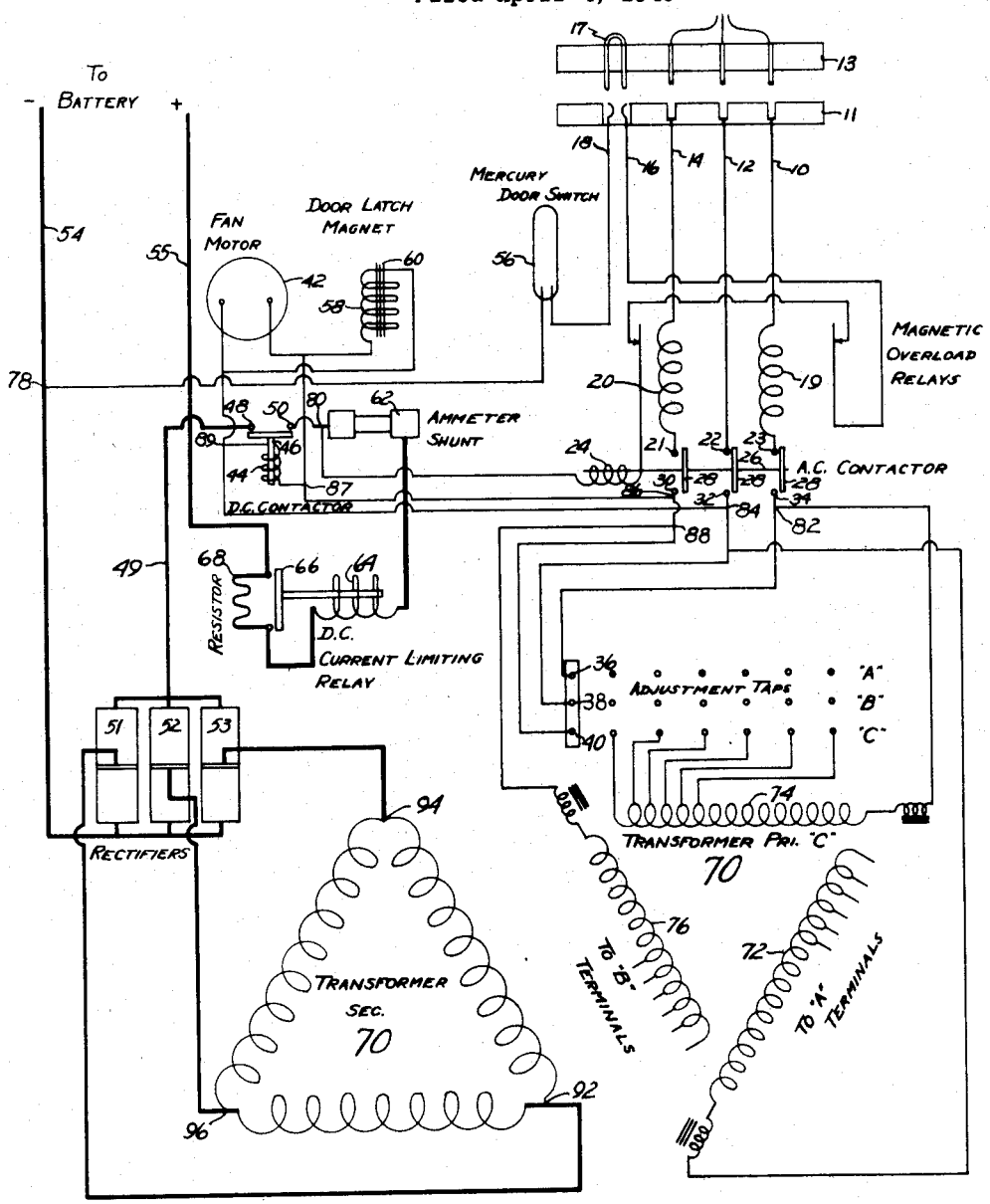
Fig. 4 is a schematic diagram of the electrical circuits employed in the described adaptation of the invention.

The battery charger may roughly be considered to comprise three circuits: primary circuit, alternating current circuit, and the charging circuit. The primary circuit as shown in Fig. 4 consists of that portion of lead 54 between junction 78 and the battery, mercury switch 56, leads 16 and 18, conductor 17, magnetic overload relays 19 and 20, solenoid coil 24, junction 80, ammeter shunt 62, solenoid coil 64, armature 66 or resistor 68, and lead 55. The alternating current circuit consists of leads 10, 12, and 14, magnetic overload relays 19 and 20, contacts 21, 22, 23, 30, 32, and 34, contactors 28, electric junctions 82, 84, 86, 87, 88, and 89, solenoid coil 44, fan motor 42, solenoid coil 58, binding posts 36, 38, and 40, primary windings 72, 74, and 76 of transformer 70, the secondary winding of transformer 70, and transformer taps 92, 94, and 96. The charging circuit consists of rectifiers 51, 52, and 53, lead 54, lead 49, contacts 48 and 50, armature 46, junction 80, ammeter shunt 62, solenoid coil 64, armature 66 or resistor 68, and lead 55.

The three circuits are interconnected in such a manner that the opening or closing of the primary circuit causes the other two circuits to open and close. The charging circuit remains open until the alternating current circuit actuates solenoid coil 44 and forces armature 46 into engagement with contacts 48 and 50, thereby closing the charging circuit. The alternating current circuit in turn remains open until the primary circuit actuates solenoid coil 24. The actuation of solenoid coil 24 forces armature 26 to move, and causes contactors 28 to bridge contacts 21 and 30, 22 and 32, 23 and 34, thereby completing the alternating current circuit. It can be seen, therefore, that the primary circuit controls the electrical operation of the battery charger.

The electrical operation of the charger can be understood by reference to Fig. 4. To start the charger, plug 13 is inserted in receptacle 11 and starting handle 98 is moved to the "on" position. The movement of handle 98 tilts mercury switch 56 into its circuit-closing position, and the insertion of plug 13 into receptacle 11 bridges leads 16 and 18 by conductor 17. The bridging of leads 16 and 18 and the tilting of mercury switch 56 complete the primary circuit. Current flows from the battery carried by the rolling stock, through lead 55, resistor 68 or armature 66, solenoid coil 64, ammeter shunt 62, electric junction 80, solenoid coil 24, magnetic overload relays 19 and 20, lead 16, conductor 17, lead 18, mercury switch 56, electric junction 78, lead 54 and back to the battery. The flow of current through solenoid coil 24 acts to draw armature 26 and the contactors 28 mounted on armature 26, into engagement with contacts 21 and 30, 22 and 32, and 23 and 34. The engagement of contactors 28 with contacts 21 and 30, 22 and 32, and 23 and 34 completes the alternating current circuit. The completion of the alternating current circuit excites the transformer 70, operates fan motor 42, and excites solenoid coils 44 and 58. The excitation of solenoid coil 58 moves armature 60 into the door holding position and prevents the closing of door 100 while the alternating current circuit is complete. The excitation of transformer 70 results in the energization of rectifiers 51, 52, and 53, and the resultant rectification of current. The excitation of solenoid coil 44 completes the charging circuit, and permits rectified current to flow from the rectifiers to the battery.

Figure 3:
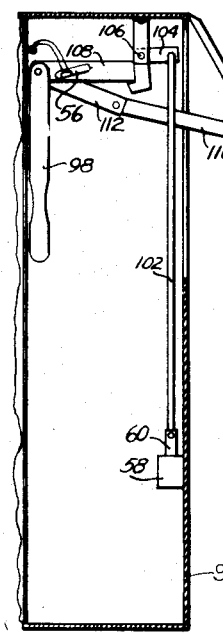
Fig. 3 shows the same elements when the door in the casing is open.
Figure 2:
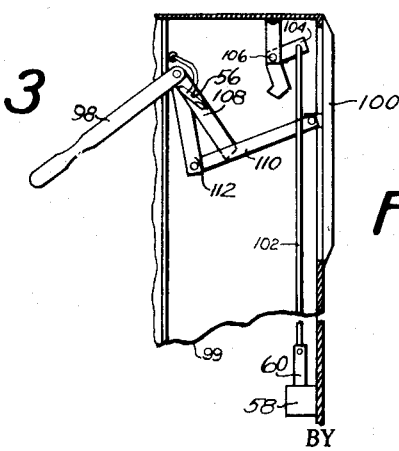
Fig. 2 shows in detail the electrical and mechanical means associated with the starting handle when the door in the casing is closed.

The mechanical operation of the charger can be understood by reference to Figs. 2 and 3. To start the charger, the handle 98 is moved to the "on" position and plug 13 is inserted in receptacle 11. The rotation of starting handle 98 causes the rotation of lever 112 which is rotatable with the starting handle 98, the movement of lever 110 which is pinned to lever 112 and door 100, and the resultant opening of door 100. Lever 108 also rotates with starting handle 98 and engages catch 104. Catch 104 is rotated in a clockwise direction by the movement of lever 102 and armature 60 in response to the excitation of solenoid coil 58. The catch 104 rotates around pivot 106 and engages the under side of lever 108, preventing rotation thereof. This keeps door 100 open as long as solenoid coil 58 is excited. When the coil 58 no longer is excited, the catch 104 is forced to rotate in a counterclockwise direction by the movement of lever 102 and armature 60 in response to the force of a spring not shown. When the latching engagement of levers 108 and 104 is broken, the weight of door 100 causes it to close and move starting handle 98 into the "off" position.

A battery charger for railroad rolling stock must be compact in size and must have a large capacity. Such a charger must be cooled when operated and protected from dust and dirt when the rolling stock is in motion. The invention does this by enclosing the charger in a substantially waterproof casing that has a door in it. In addition, the charger is so designed that the door of the casing must be open and the fan motor started before the rectifier will operate. The operator may insert plug 13 into receptacle 11, but the device will not operate until starting handle 98 is moved into the "on" position. Until the starting handle 98 is moved into the "on" position, the mercury switch 56 is in the open circuit position and the primary circuit of the charger is open. Until the primary circuit is closed by the mercury switch 56, rectifier will not operate. This positively prevents overheating of the rectifier caused by lack of cooling. After the plug 13 has been inserted in receptacle 11, and the starting handle 98 moved into the "on" position, the energization of solenoid coil 58 and the resultant movement of catch 104 prevent the closing of door 100. When the operation of the charger is to be suspended, the operator removes plug 13 from receptacle 11. This breaks the primary and alternating current circuits, and causes the opening of the charging circuit and the closing of the door. The breaking of the alternating current circuit suspends the excitation of door latch magnet coil 58 and permits the door 100 to close under the influence of gravity.

The receptacle 11 may be mounted on the charger casing or may be mounted on the side of the car or wherever else it would be convenient, and the charger may be mounted in such a position that the starting handle 98 is readily accessible to the attendants.

Transformer 70 is provided with adjustment taps arranged in three rows, A, B, and C. By proper use of these taps, any desired capacity may be attained and adjustment may be made for decreased efficiency of the rectifier which results from long usage.

Figure 6:
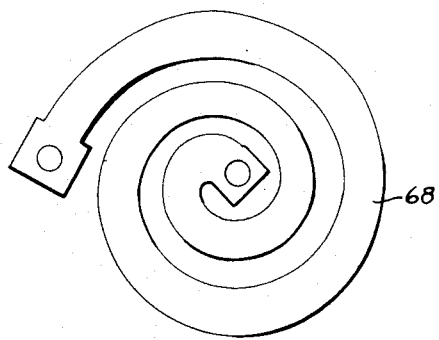
Fig. 6 is a view of the resistance used to limit the current in the charging circuit.

To prevent the current passing through the rectifier from exceeding a predetermined value, a relay is incorporated in the charging circuit which causes a resistance to be inserted in the charging circuit when the current reaches a predetermined value. This relay is shown schematically in Fig. 4 and is denoted by the numerals 64, 66, and 68. The coil denoted by numeral 64 will draw the low resistance armature 66 out of the charging circuit when the current reaches a predetermined value, and the current will, therefore, have to pass through resistance 68. This resistance is designed to keep the current below a certain value. Because of its design, the resistor gets quite warm when heavy currents pass through it. As the resistor gets warm, its resistivity increases and serves to check the flow of current therethrough. The resistor as shown in Fig. 6 is made in the form of an open spiral to give it a good deal of surface and a chance to dissipate the heat it accumulates. By proper design the resistor achieves a balance between the heat created by the current and the heat dissipated and maintains the current between predetermined limits. When the current drops below the predetermined value, the magnetic force of the coil 64 is overcome by a spring in the relay, and the low resistance armature 66 is put back into the circuit. The result of the use of this relay and resistance is to provide a fairly constant charging current over a wide range of voltages.

Figure 5:
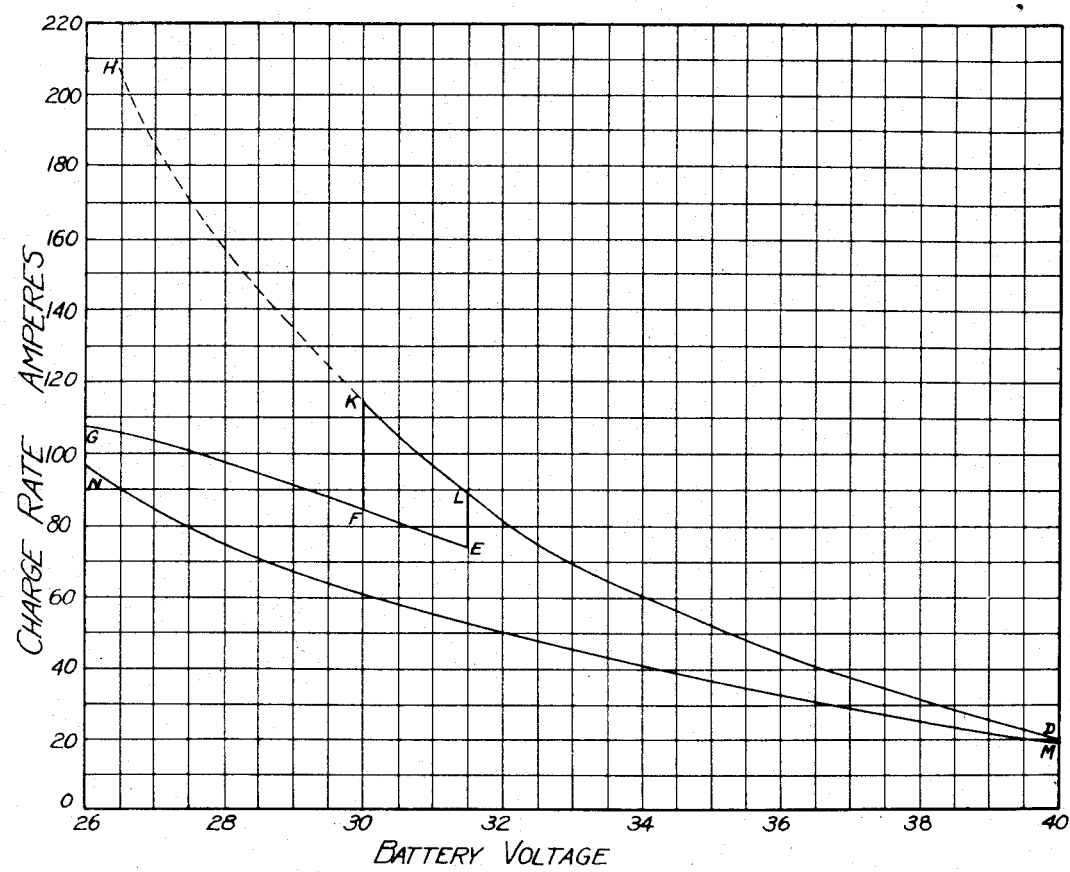
Fig. 5 is a graph of a performance curve of a battery charger made in accordance with the principles of the invention.

In Fig. 5 is shown a graph of an actual test of the voltage and amperage values of a charger equipped with the relay and resistor, compared with the theoretical curve of a charger designed to give a peak load of 100 amperes at about 26 volts. In the test, the voltage was lowered and measurements were taken. The curve obtained by decreasing the voltage of the charger equipped with the current-limiting means, is D, L, E, F, G. As the voltage decreases the amperes increase until the value L is reached. When this value is reached, relay 64 is excited sufficiently to draw low resistant armature 66 out of the charging circuit and cause the current to pass through resistor 68. The insertion of resistor 68 causes the current to drop to the value E. With a continued decrease in the voltage, the current will again increase but does so along a new curve E, F, G. The current is kept below the predetermined maximum by reason of the thermo-electric properties of the resistor 68. When the voltage increases, the current decreases and the performance curve is G, F, K, L, D. The return curve is not the same as the curve obtained when the current was increasing, but this is partially due to the heating of resistor 68 and partially due to the characteristics of the rectifiers 51, 52, and 53. The curves D, L, K, H and M, N are performance curves of battery chargers which were not equipped with means to limit the current passing through the rectifier. Curve D, L, K, H is the performance curve of a charger having the same capacity as the charger whose curve is represented by D, L, E, F, G. It can be seen from these curves that without the current-limiting means the current may become excessive when the voltage falls to a low value. This high current may permanently injure the rectifiers and would certainly shorten its effective life. Curve M, N represents the performance of a charger designed to give a maximum current of less than 100 amperes when the voltage is about 26 volts. There would be no danger of excessive current from such a charger, but when the voltage increased the current would fall to a very low value. The invention reaches a desirable medium between the two extremes shown in Fig. 5, and maintains a strong current at all times but never allows it to rise above a reasonable value. This value may be ascertained for each individual use of the charger, and the value may be obtained by proper adjustment of the transformer taps with which the charger is equipped.

From the foregoing description, it can be seen that the invention provides a battery-charging means for railway cars, the operation of which is as simple and certain as possible.

What I claim is:

1. In a battery charger that is carried by railroad rolling stock and operative when such rolling stock is not in motion, a substantially waterproof case enclosing a dry disc rectifier, a door portion on the waterproof case adapted to be opened by mechanical means to permit passage of air through the case, mechanical means to open the door portion of the case, electrical means to prevent operation of the charger until the door portion of the case is open, electrical means to keep the door portion of the case open while the charger is operating, means to move air through the case, and a current-limiting means to maintain the current passing through the rectifier near a predetermined value.

2. An interlocking mechanical and electrical protective arrangement for a battery charger that is carried by railroad rolling stock and operative when such rolling stock is not in motion, comprising a waterproof casing enclosing a rectifier, a door portion in the waterproof casing that may be opened to permit cooling of the rectifier, a handle on the waterproof casing that is arranged to open the door mechanically, removable means to supply alternating current to the battery charger, and an electrical system for said rectifier having an electrical switch and an electrical door-holding means therein, said electrical switch preventing the actuation of the electrical system until the said door portion is open, said electrical door-holding means maintaining the door portion in the open position during the actuation of the electrical system, said doorholding means being arranged to permit the door portion to close automatically under the influence of gravity whenever the alternating current supplying means is removed.

3. An interlocking mechanical and electrical protective arrangement for a battery charger that is carried by railroad rolling stock and operative when such rolling stock is not in motion, comprising a waterproof casing enclosing a rectifier, a door portion in the waterproof casing that may be opened to permit cooling of the rectifier, a handle on the waterproof casing that is arranged to open the door mechanically, removable means to supply alternating current to the battery charger, and an electrical system for said rectifier having an electrical switch and an electrical door-holding means therein, said electrical switch being responsive to the position of the said door portion and being arranged to prevent the actuation of the electrical system until the said door portion is open, said electrical door-holding means maintaining the door portion in the open position during the actuation of the electrical system, said door-holding means being arranged to permit the door portion to close automatically under the influence of gravity whenever the alternating current supplying means is removed.

4. An interlocking mechanical and electrical protective arrangement for a battery charger that is carried by railroad rolling stock and operative when such rolling stock is not in motion, comprising a waterproof casing enclosing a rectifier, a door portion in the waterproof case that may be opened to permit cooling of the rectifier, a handle on the waterproof casing that is arranged to open the door mechanically, removable means to supply alternating current to the battery charger, and an electrical system for said rectifier, said handle being interlocked with the said electrical system such that the handle must be moved into the "on" position and the removable alternating current supplying means must be inserted to actuate the battery charger, and said removable alternating current means must be removed to halt the operation of the battery charger.

CARL E. PETERS.